United States Patent [19]
Cline et al.

[11] 3,800,380
[45] Apr. 2, 1974

[54] COMPOSITION FOR CUTTING TOOL

[76] Inventors: Carl F. Cline, 2356 Welsh Ct., Walnut Creek, Calif.; Mark L. Wilkins, 1179 Burgundy Way, Livermore, Calif. 94550

[22] Filed: Apr. 1, 1971

[21] Appl. No.: 130,280

[52] U.S. Cl. .............................. 29/95 R, 29/95 A
[51] Int. Cl. ........................................... B26d 1/00
[58] Field of Search ............... 29/95 R, 95 A, 95 C; 408/144

[56] References Cited
UNITED STATES PATENTS
| | | | |
|---|---|---|---|
| 3,564,683 | 2/1971 | Schedler et al. | 29/95 |
| 2,414,231 | 1/1947 | Kraus | 29/95 |
| 2,053,977 | 9/1936 | Taylor | 29/95 A |
| 2,858,718 | 11/1958 | Kohler | 408/144 |
| 3,017,790 | 1/1962 | Werle | 408/144 |
| 1,887,373 | 11/1932 | Emmons et al. | 29/95 A |

FOREIGN PATENTS OR APPLICATIONS
| | | | |
|---|---|---|---|
| 592,580 | 10/1932 | Germany | 29/95 R |

*Primary Examiner*—Leonidas Vlachos
*Attorney, Agent, or Firm*—Lindenberg, Freilich & Wasserman

[57] ABSTRACT

A cutting tooling is provided wherein there is a gradual transition from the hard cutting exterior material to a relatively soft interior material to provide a viscous damped cutting tool yet one having sufficient mechanical support for its cutting edge.

9 Claims, 5 Drawing Figures

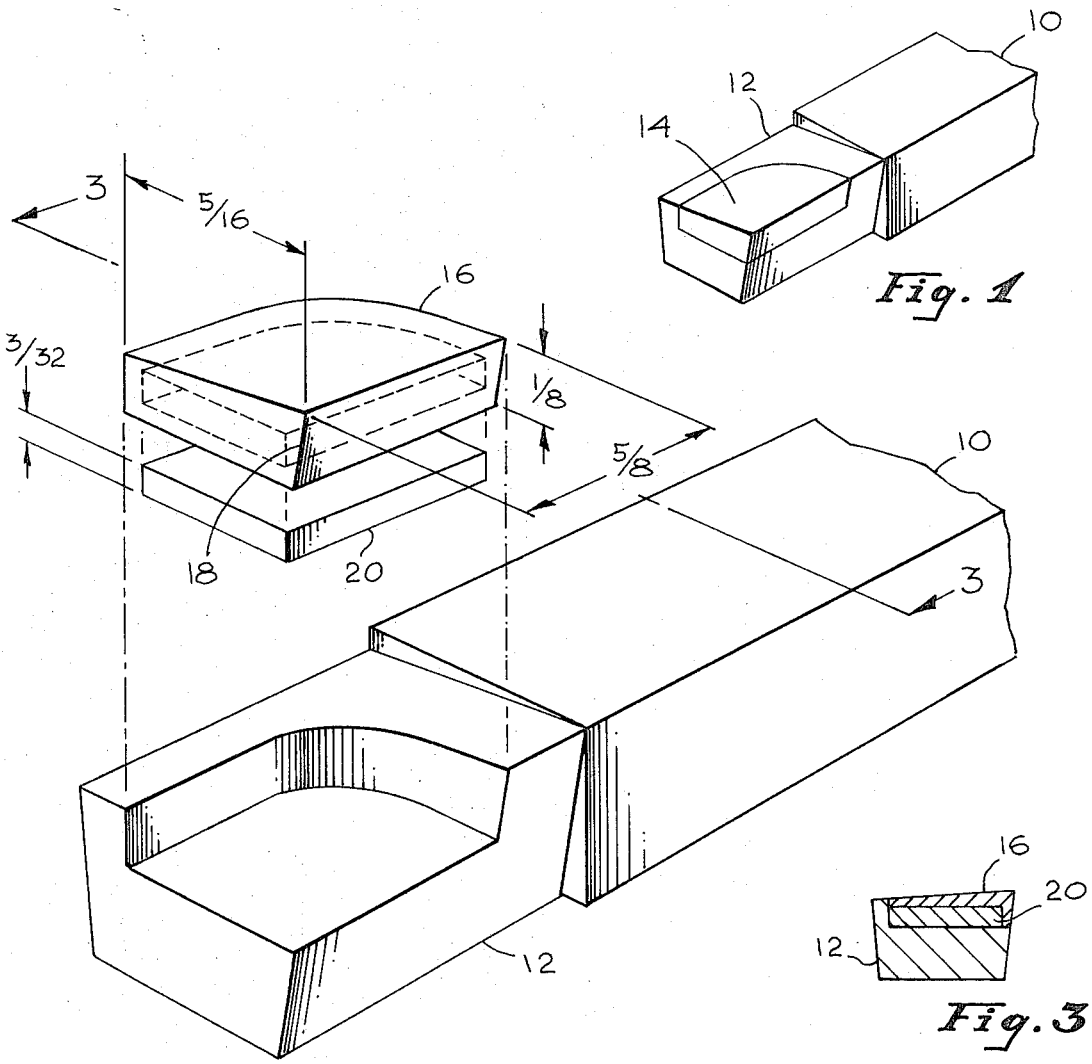
Fig. 1
Fig. 2
Fig. 3
Fig. 5
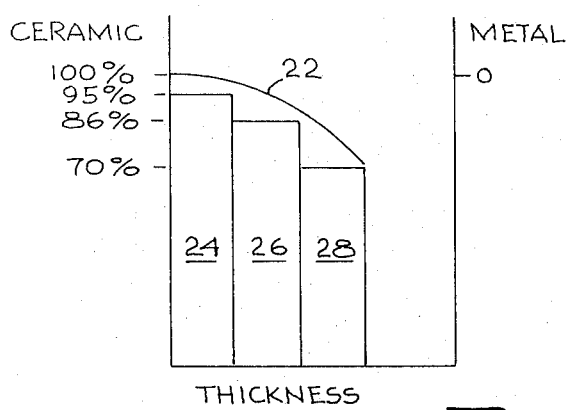
Fig. 4
INVENTORS
CARL F. CLINE
MARK L. WILKINS
BY
Lindenberg Freilich & Wasserman
ATTORNEYS

3,800,380

COMPOSITION FOR CUTTING TOOL

BACKGROUND OF THE INVENTION

This invention relates to cutting tools and more particularly to improvements therein.

Vibrations are the worst limiting factors affecting machine tool production. The cutting action introduces strains into the work piece that permit elastic energy to be stored in the work piece in the regions of the cutting tool. The elastic energy is released in a non steady way as the cut proceeds into the work piece. The stored elastic energy is due to the shear strength of the work piece material. The magnitude of the elastic energy and its distribution around the tool depend on the rate of cut, depth of cut and the extent of work hardening plus any time dependent strength characteristics of the work piece material. Work hardening alone introduces a discontinuity in the mechanical behavior of the work piece material that results in a periodic force being applied to the cutting tool.

The release of stored energy after an incremental cut and the discontinuous mechanical properties of the work piece material due to work hardening or time dependent strength phenomena are inherent sources of vibration or chatter. The elastic behavior of a ceramic at high loads permits a ceramic cutting tool to efficiently couple to the source of vibration the interaction of the elastic energy stored in the cutting tool with the non steady forces in the work piece material results in an unstable chatter.

As a result of chatter, the tool overheats, wears rapidly and/or fractures. Besides in the presence of chatter the surface finish of the work piece is marred.

The problem presented is to provide a cutting tool which has sufficient viscosity to damp out the chatter yet provide a hard cutting edge which does not fracture because of insufficient mechanical support. The prior art shows a cutting tool having a ceramic or a low metal to ceramic ratio cermet cutting portion backed by a metal. The trouble with such a structure is that the soft metal does not produce a sufficiently strong mechanical backing for the cutting portion.

This is unsatisfactory since the cutting portion will fracture from tensile stresses in the absence of sufficient support. Attempts at softening the cutting edge to achieve damping of chatter are obviously unsatisfactory since this results in rapid tool wear.

OBJECTS AND SUMMARY OF THE INVENTION

An object of this invention is to provide a cutting tool construction with viscous damping to minimize chatter, and a sufficient mechanical backing for the hard cutting edge material to prevent fracturing due to tensile stresses.

Another object of this invention is to provide a tool construction which enables a better surface finish to be obtained as a result of a cutting operation than heretofore possible.

Yet another object of the invention is to provide a novel and improved cutting tool construction.

These and other objects of the invention may be achieved by constructing a cutting tool in a manner so that it has a hard cutting member for the cutting operation while the remainder of the tool both cushions vibration or chatter caused by the cutting operation and provides sufficient mechanical support for the cutting portion to eliminate damage due to stress. This is achieved by providing a change in composition from the hard outer cutting edge to the soft interior region so as to avoid a sudden transition in mechanical properties at the boundary with the hard outer cutting member. By transitioning from the usual outer cutting edge of a ceramic material or a high ceramic low metal ratio cermet, through a cermet region, in which the amount of metal to ceramic increases to a metal region, the cutting tool is made sufficiently viscous to damp out chatter. The abrupt change in mechanical properties of the high hardness ceramic to a soft metal core introduces large tensile stresses into the ceramic which limits the machining performance of the tool. The cermet transition region provides adequate mechanical support for the cutting edge material while acting as a mechanical impedance transition between the ceramic cutting portion and the metal core. This design minimizes the adverse tensile stresses imposed on the hard cutting edge material by the work piece.

This invention provides a tool that can withstand dynamic cutting operations. By dynamic cutting is meant cutting operation that place intermittent loads on the tool. As a result, non-steady forces are placed on the tool. For example, in milling, boring and interrupted cut turning operations there are periodic loads placed on the tool as the tool engages and disengages the workpiece. The abrupt removal of the load on the tool permits the tool to recover and overshoot its equilibrium position. Tensile stresses then occur causing tool failure by fracture. Viscous damping, inherent in the cutting tool construction, made in accordance with this invention, provides the mechanism to reduce the tensile load and prolong the tool life. Comparative test data under controlled circumstances showed that a tool constructed in accordance with this invention lasted three times longer than the best available commercial tool, such as one having monolithic titanium carbide construction.

The novel features of the invention are set forth with particularity in the appended claims. The invention will best be understood from the following description when read in conjunction with the accompanying drawings.

BRIEF DESCRIPTION OF THE DRAWINGS

FIG. 1 is an isometric view of a present day cutting tool shown for providing an appreciation construction of the invention.

FIG. 2 is an exploded isometric view illustrating an embodiment of the invention.

FIG. 3 is a view in section along the lines 3—3 of FIG. 2.

FIG. 4 is a graph illustrating the construction of the invention.

FIG. 5 is a cross-section of a rotational cutting tool shown to illustrate how the invention is used therein.

DESCRIPTION OF THE PREFERRED EMBODIMENT

Referring now to FIG. 1, a cutting tool usually comprises a shank portion 10 which has a tool holder portion 12 brazed thereto, which is hollowed out to receive the cutting member 14. The cutting member is brazed into the tool holder portion 12. The cutting member is usually made of high hardness refractory material such as tungsten carbide or titanium carbide usually a ceramic composition known as ceramics or high hardness cermets which are ceramics with low metal to ceramic ratio for hardness. The tool holder and shank are made of metal. It has also been known in the prior art to make the cutting member of a ceramic or cermet which is then brazed to a metal to match thermal stress characteristics. The metal is brazed to the tool holder. It is also known in the prior art to spray the cutting member with a thin ceramic film to improve hardness.

Referring now to FIG. 2 and FIG. 3, there may be seen an exploded isometric view of an embodiment of the invention in FIG. 2, while FIG. 3 is a cross sectional view along the lines 3—3. The cutting member comprises an outer shell 16, which includes the cutting edge 18, is made of a hard cutting material such as a ceramic or high hardness cermet. The center of the cutting member 20 is hollowed out to receive a softer and more resilient material such as a cermet to partially absorb tool vibration and/or chatter, and yet which is hard enough to provide a sufficiently firm support for the outer shell to withstand the stress applied to it when it is used for cutting. The curved back wall of the cutting member is open and the back wall of the cermet is curved to conform to the curve of the back wall of the cutting member so that when the cermet is inserted into the cutting member the curved backwalls are aligned with one another. The upper surface and the two rectangular sides of the cermet are brazed to the corresponding portions of the inside of the cutting member. The curved back walls of the cutting member and the cermet are brazed to the shank. The bottom of the cermet and the portion of the cutting member wall surrounding it are brazed to the flat portion of the shank. Thus, the center material is brazed into the shell, and then the composite is brazed to the tool holder which is made of metal.

By way of example, and not as a limitation in one arrangement the outer material which performs the actual cutting is a hard cermet such as 8 volume percent nickel molybdenum with the remainder made of titanium carbide, while the center material is a softer cermet consisting of titanium carbide plus 30 volume percent metal binder such as nickel molybdenum. This is brazed to the metal steel tool holder 12 which is relatively soft and assists in providing the required viscous damping action.

While only one transition stage is illustrated between ceramic and metal, this is by way of illustration and does not constitute a limitation on the invention. More transition stages may be used if required each stage being a cermet of a higher metal to ceramic ratio than the preceding one which is closest to the outer shell. Also shown in FIG. 2 are some exemplary dimensions for the embodiment of the invention.

While the embodiment of the invention thus far described illustrates the transition in discreet phases or layers from a hard elastic cutting edge, through a less hard more viscous material to a soft viscous material, it may be possible to make such a transition gradually by using powder metallurgy techniques. This can be done for example by employing a die into which there is introduced a layer of powdered ceramic, adjacent to a layer of powdered cermet, adjacent to a layer of powdered metal. These are compressed and heated with the pressure and temperature which is used being those usually used with powdered metallurgy. The resultant cutting tool is then brazed to the holder. It should be noted that the center material 20 provides a mechanical impedance transition. Mechanical impedance is defined as the product of the density of the material and the speed of sound through the material. The sound speed varies with the elastic modulii of the material. In order to avoid a sudden transition in mechanical impedance at the interface between the cutting material and the underlying transition material, the mechanical impedance of the transition material must be far closer in value to the value of the mechanical impedance of the cutting material than to the value of the mechanical impedance of the tool shank or the layer of the material to which the transition material is attached. By way of example, it is desirable that the mechanical impedance of the transition material should have less than a 10% change from the value of the mechanical impedance of the cutting material in the region of the interface between the transition material and the cutting material.

In FIG. 4 the curve 22 shows a smooth transition from the cutting edge which would be 100 percent ceramic through a cermet region, and then transitioning into a metal region at the center. However, because of the difficulty of continuously phasing from one material to another, and because excellent results are achieved, it is preferred to make the transitions in discreet phases as illustrated by the rectangles 24, 26 and 28 which exemplify transitions from a high ceramic to metal ratio through two successively lower ceramic to metal ratios to metal. The materials required are commercially available and all that need be done is to cut them and shape them and then braze them together. It should be noted that the composition of the cutting edge material, as represented by the rectangle 24, is 95 percent ceramic and 5 percent metal. The transition region 26 is 86 percent ceramic and 14 percent metal. This material change provides a mechanical impedance change of less than 10 percent between the two materials.

The use of the brazing technique to attach the phases to one another does not interfere with obtaining the properties desired for the cutting tool, namely a cutting tool with a hard cutting surface, which has sufficient mechanical support and which tool is sufficiently viscous to eliminate the effects of chatter.

FIG. 5 illustrates how this invention may be applied to a cutting tool such as a drill. FIG. 5 is a cross-section of the cutting portion of the drill which would be made in accordance with this invention. The outer portion of the drill 30 would be made of the hard cutting material such as the ceramic. The inner portion of the drill 32 could be made of a metal. If the outer periphery 30 is made of a ceramic, and the center is made of a metal, then the portion 34 could be made of a cermet. If the outer portion is made of a hard cermet, then the center portion could be made of a metal and the region between them could be made of a cermet whose composition contains more metal and therefore is softer than that of the outer portion. By way of illustration, if a half inch diameter tool were to be made, the center would have a one-quarter inch radius, the spacing adjacent the center would be on the order of 1/16 and the outer cutting edge would extend for the remainder of the drill size. The center metal core would be brazed to the cermet cylinder. This in turn would be brazed to the outer cermet cylinder.

The ceramic, cermet and metal materials referred to herein and which may be used with this invention are commercially obtainable and well known in this art.

There has accordingly been described and shown herein a novel construction for a cutting tool which substantially eliminates the problem of tool chatter with its consequent deleterious effects on both the cutting tool and the work piece. By using this invention, high hardness materials even with poor tensile properties can be used as the cutting surface. High hardness is desirable for a cutting tool since it minimizes wear.

What is claimed is:

1. A cutting tool constructed to minimize tool chatter comprising an outer cutting region which contacts a workpiece, said cutting region being made of a material which is hard and elastic, an inner supportive region which is made of a material which is soft and resilient when compared to the material of the outer region, and a mechanical impedance transition region made of a material joining the inner supportive region and outer cutting region which is less elastic and softer than the outer region yet harder and more elastic than the inner region and has a mechanical impedance value which is more than the mechanical impedance value of the inner supportive region and less than but closer in value to the value of the mechanical impedance of the cutting region than the value of the mechanical impedance of the supportive region, said transition region being covered over by said cutting region to prevent any contact with a workpiece.

2. A cutting tool as recited in claim 1 wherein the material of said outer cutting region has a higher ceramic to metal ratio than the material joining it to said inner region material, and said inner region material is a metal.

3. A cutting tool as recited in claim 1 wherein said outer cutting region is a ceramic material, said inner supportive region is metal material, and the transition region material joining the two is a cermet.

4. A cutting tool as recited in claim 1 wherein said material of said outer cutting region is brazed to the transition material between it and the material of said inner region, and the material of the inner supportive region is brazed to the transition material between it and the material of said outer cutting region.

5. A cutting tool as recited in claim 1 wherein material of said outer cutting region is a cermet material having a higher ceramic to metal ratio than said transition material joining it to said inner material.

6. A cutting tool as recited in claim 1 wherein said outer cutting region has a top and a bottom side, joined by two relatively rectangular walls and a curved wall extending between the ends of said two relatively rectangular walls, there being a three sided opening in said bottom side which is defined by walls adjacent said two rectangular walls and a third wall adjacent said top side, said transition material joining said inner and outer regions fills said opening and has a top surface brazed to said third surface, two walls brazed to said two rectangular walls and a third curved wall which is coextensive with said curved wall of said outer region, and said coextensive curved walls, the remainder of said bottom side and the remaining exposed side of said transition material joining said inner and outer regions all being brazed to said material of said inner supportive region.

7. A cutting tool as recited in claim 6 wherein said material of said outer cutting region is cermet material, said material joining said inner to said outer material is a cermet material having a greater metal to ceramic ratio than said material of said outer region, and said inner material is a metal.

8. A cutting tool as recited in claim 1 wherein said material of said outer cutting region is in the form of a hollow cylinder extending to a closed tip, said material of said inner supportive region constitutes a central core within said cylinder, and said material of said completely enclosed transition region joins said central core to said hollow cylinder.

9. A cutting tool as recited in claim 1 wherein the value of the mechanical impedance change between said cutting region and said mechanical impedance transition region is 10 percent or less.

* * * * *